United States Patent [19]

Howard et al.

[11] Patent Number: 4,789,598

[45] Date of Patent: * Dec. 6, 1988

[54] THIN FILM MEDIUM FOR HORIZONTAL MAGNETIC RECORDING HAVING AN IMPROVED COBALT-BASED ALLOY MAGNETIC LAYER

[75] Inventors: James K. Howard, Morgan Hill; Run-Han Wang, San Jose, both of Calif.

[73] Assignee: International Business Machines Corporation, Armonk, N.Y.

[*] Notice: The portion of the term of this patent subsequent to Mar. 31, 2004 has been disclaimed.

[21] Appl. No.: 5,190

[22] Filed: Jan. 20, 1987

[51] Int. Cl.$^4$ .............................................. G11B 5/64
[52] U.S. Cl. .................... 428/408; 427/128; 427/131; 204/192.16; 204/192.2; 428/446; 428/694; 428/695; 428/704; 428/900; 428/666; 428/670; 428/928
[58] Field of Search ............... 428/694, 900, 928, 678, 428/666, 670, 446, 408, 704; 204/192.16, 192.2; 427/128, 131

[56] References Cited

U.S. PATENT DOCUMENTS

| | | | |
|---|---|---|---|
| 4,438,066 | 3/1984 | Aboaf et al. | 420/435 |
| 4,552,820 | 11/1985 | Lin et al. | 428/611 |
| 4,587,176 | 5/1986 | Carcia | 428/611 |
| 4,632,883 | 12/1986 | Howard et al. | 428/680 |
| 4,652,499 | 3/1987 | Howard | 428/679 |
| 4,654,276 | 3/1987 | Ahlert et al. | 428/679 |

FOREIGN PATENT DOCUMENTS

| | | |
|---|---|---|
| 140513 | 8/1984 | European Pat. Off. |
| 145157 | 10/1984 | European Pat. Off. |
| 88806 | 5/1984 | Japan |
| 217224 | 12/1984 | Japan |
| 29926 | 2/1985 | Japan |
| 253622 | 11/1986 | Japan |
| 2125069 | 6/1983 | United Kingdom |

OTHER PUBLICATIONS

James E. Opfer et al., "Thin-Film Memory Disc Development", Hewlett-Packard Journal, vol. 36, No. 11 (Nov. 1985), pp. 4-10.
J. A. Aboaf et al., "Magnetic Properties and Structure of Cobalt-Platinum Thin Films", IEEE Trans. on Magnetics, vol. MAG-19, No. 4 (Jul. 1983), pp. 1514-1519.
Eric R. Katz et al., "Effect of Bitshift Distribution on Error Rate in Magnetic Recording", IEEE Trans. on Magnetics, vol. MAG-15, No. 3 (May 1979), pp. 1050-1053.
Nathan R. Belk et al., "Measurement of the Intrinsic Signal-to-Noise Ratio for High-Performance Rigid Recording Media", J. Appl. Phys., 59(2) (Jan. 15, 1986), pp. 557-563.
J. T. Jacobs, "PtCoCr Films for Digital Magneto-Optic Recording", IBM Technical Disclosure Bulletin, vol. 17, No. 12 (May 1975), pp. 3714-3715.

Primary Examiner—Ellis P. Robinson
Attorney, Agent, or Firm—Thomas R. Berthold

[57] ABSTRACT

An improved thin film metal alloy media for horizontal magnetic recording has a magnetic layer of an alloy comprising cobalt, platinum and chromium, where the chromium concentration in the alloy is greater than 17 at.%. The media exhibits unexpectedly high signal-to-noise ratio (SNR) and minimal time jitter, thereby resulting in a media which is capable for use at high linear recording density. The media also exhibits excellent corrosion resistance because of the chromium present in the alloy, thereby eliminating the need for a barrier layer between the magnetic layer and the protective overcoat.

3 Claims, 4 Drawing Sheets

THIN FILM MEDIUM FOR HORIZONTAL MAGNETIC RECORDING HAVING AN IMPROVED COBALT-BASED ALLOY MAGNETIC LAYER

BACKGROUND OF THE INVENTION

1. Field of the Invention

This invention relates to thin film metal alloy magnetic recording disks for horizontal recording, and in particular to such disks in which an alloy of cobalt, platinum and chromium forms the magnetic layer.

2. Description of the Prior Art

Cobalt-based alloys which are known as capable for use in horizontal magnetic recording media include cobalt-nickel (CoNi), cobalt-rhenium (CoRe), cobalt-palladium (CoPd), cobalt-chromium (CoCr) and cobalt-platinum (CoPt). In such media, the hexagonal close packed (HCP) crystalline structure of the cobalt alloy is formed on the substrate, or on an intermediate underlayer, so that the C-axis, i.e., the [002] axis, of the cobalt alloy film is either in the plane of the film or has a component in the plane of the film.

While CoCr is known primarily for its use in perpendicular magnetic recording media, a CoCr magnetic layer may exhibit horizontal magnetic anisotropy in the presence of a specific underlayer. For example, a thin film disk for horizontal recording with a composite magnetic layer of CoCr and Cr formed over an underlayer of nickel-vanadium is described in U.S. Pat. No. 4,552,820. However, CoCr has several disadvantages as a magnetic layer for horizontal recording. In order to assure horizontal magnetic anisotropy a relatively thick, e.g. 2000–3000 Angstroms, underlayer is required. In addition, because the horizontal coercivity of a CoCr layer decreases with increasing thickness of the layer, the maximum horizontal coercivity is approximately in the range of 600–800 Oersteds (Oe).

The coercivity and other properties of CoPt films have been reported by Opfer, et al., in "Thin Film Memory Disc Development", *Hewlett-Packard Journal*, November 1985, pp. 4–10; and by Aboaf, et al., in "Magnetic Properties and Structure of Co-Pt Thin Films", *IEEE Trans. on Magnetics*, MAG-19, 1514 (1983). A CoPt thin film magnetic recording medium with between 10–30 atomic percent (at.%) platinum (Pt) is described in U.S. Pat. No. 4,438,066, which is assigned to the same assignee as this application. While CoPt media exhibit desirable magnetic properties, the CoPt magnetic layer is highly susceptible to oxidation or corrosion. Thus, as described in European patent application 145157, published June 19, 1985, and assigned to Hewlett-Packard Company, it is necessary to apply a barrier layer of chromium, titanium or other suitable material over the CoPt magnetic layer.

A thin film disk with a cobalt-platinum-chromium (CoPtCr) magnetic layer, in which chromium (Cr) comprises between 1–17 at.%, is described in Japanese patent application Kokai No. 59-88806, published May 22, 1984. The CoPtCr magnetic layer is described as being sputter-deposited directly onto an aluminum substrate with a nickel-phosphorous coating and as having improved corrosion resistance over prior magnetic layer alloy compositions.

European patent application 140513, published May 8, 1985, and assigned to the same assignee as this application, describes on pages 9–12 a horizontal recording structure comprising a magnetic layer of a CoCrZ ternary alloy formed on a nonmagnetic underlayer of a CoCrX ternary alloy. The elements Z and X may be chosen from a long list of elements, including Pt, and may be present in a wide range of percentage compositions. The magnetic layer may not be deposited directly on the substrate but must be formed on the specific ternary alloy underlayer in order to exhibit in-plane C-axis orientation.

One of the problems with thin film metal alloy media is that the intrinsic media noise increases with increasing linear recording density. Media noise arises from fluctuations in the zig-zag shaped magnetic transitions and results in random shifts of the readback signal peaks. These random shifts are referred to as "peak jitter" or "timer jitter". Thus, the higher the media noise, the higher the bit error rate. It is therefore desirable to develop a thin film metal alloy media which generates noise below a maximum acceptable level in order that data can be recorded at maximum linear density. The effect of intrinsic media noise, as measured by peak jitter and media signal-to-noise ratio (SNR), on the bit error rate in magnetic recording systems is described by Katz, et al., in "Effect of Bitshift Distribution on Error Rate in Magnetic Recording", *IEEE Trans. on Magnetics*, Vol. MAG-15, pp. 1050–1053, 1979. The measurement of media SNR is described by Belk, et al., in "Measurement of the Intrinsic Signal-to-Noise Ratio for High Performance Rigid Recording Media", *J. Appl. Physics*, 59(2), Jan. 15, 1986, pp. 557–562.

SUMMARY OF THE INVENTION

The invention is a thin film metal alloy disk for horizontal magnetic recording in which the magnetic layer comprises an alloy of cobalt, platinum and chromium, with chromium present in a concentration greater than 17 at.%. The concentration of platinum in the magnetic layer is an amount sufficient to give the desired coercivity. The chromium concentration, which is well beyond that necessary to give acceptable corrosion resistance to the media, is essential to the invention and unexpectedly results in media with substantially reduced noise at high recording density.

For a fuller understanding of the nature and advantages of the present invention, reference should be made to the following detailed description taken in conjunction with the accompanying drawings.

DESCRIPTION OF THE PREFERRED EMBODIMENT

Thin film metal alloy disks with various magnetic layer compositions were fabricated by sputter deposition of the magnetic layer on chromium or chromium-vanadium (CrV) underlayers formed on substrates of either semiconductor-grade single-crystal silicon (Si) or aluminum-magnesium (AlMg) having a nickel-phosphorous (NiP) surface film. The structure of these disks is summarized in Table 1.

TABLE 1

| SUBSTRATE | UNDERLAYER Composition/ Thickness (Å) | MAGNETIC LAYER Composition/ Thickness (Å) | $S_0NR$ (+/−0.5 dB) |
|---|---|---|---|
| Si | Cr/300 | $Co_{85}Pt_{15}$/300 | 29.7 |
| Si | Cr/400 | $Co_{74}Pt_{13}Cr_{13}$/508 | 31.4 |
| AlMg/NiP | $Cr_{80}V_{20}$/450 | $Co_{69}Pt_{13}Cr_{18}$/550 | 33.0 |
| AlMg/NiP | Cr/500 | $Co_{68}Pt_{12}Cr_{20}$/552 | 32.5 |
| Si | Cr/400 | $Co_{68}Pt_{12}Cr_{20}$/564 | 33.6 |
| AlMg/NiP | Cr/500 | $Co_{67}Pt_{12}Cr_{21}$/439 | 35.2 |
| AlMg/NiP | Cr/2700 | $Co_{82}Cr_{18}$/500 | 33.0 |

The underlayers and magnetic layers of the disks listed in Table 1 were sputter-deposited in a single pump down of the sputtering chamber at an argon pressure of approximately 3 millitorr. The disks with the CoPt and CoPtCr magnetic layers were deposited with a bias voltage on the substrate of approximately −50 to −60 volts and included a sputter-deposited carbon overcoat of approximately 250 Å thickness and a 100 Å thick adhesion layer between the magnetic layer and the carbon overcoat. The disk with the $Co_{82}Cr_{18}$ magnetic layer was formed with a 200 Å thick carbon overcoat without an adhesion layer. The CoPtCr magnetic layers were sputter-deposited from dual targets of CoPt and Cr. Thus, for example, the $Co_{74}Pt_{13}Cr_{13}$ magnetic layer, which was formed from a $Co_{85}Pt_{15}$ target and a Cr target, may also be represented as $(Co_{85}Pt_{15})_{87}Cr_{13}$.

The intrinsic media noise for the disks listed in Table 1 was measured as a signal-to-noise ratio in decibels (dB) of the readback signal voltage of a signal written at very low magnetic transition density, e.g. 100–200 transitions/mm, to the root-mean-square (RMS) disk noise voltage, at 30 MHz bandwidth, after writing at 1200 transitions/mm. This signal-to-noise measurement is referred to as $S_0NR$. Those disks in which the CoPtCr magnetic layer had a chromium concentration between 18–21 at.% had unexpectedly high values of $S_0NR$, as shown in Table 1. The $S_0NR$ values for these disks can be compared with disks with a $Co_{85}Pt_{15}$ magnetic layer and a $Co_{74}Pt_{13}Cr_{13}$ layer. The average $S_0NR$ for the four CoPtCr disks with chromium concentration between 18–21 at.% is approximately 4 dB greater than the $Co_{85}Pt_{15}$ disk and approximately the same as for the $Co_{82}Cr_{18}$ disk.

Figure 1:
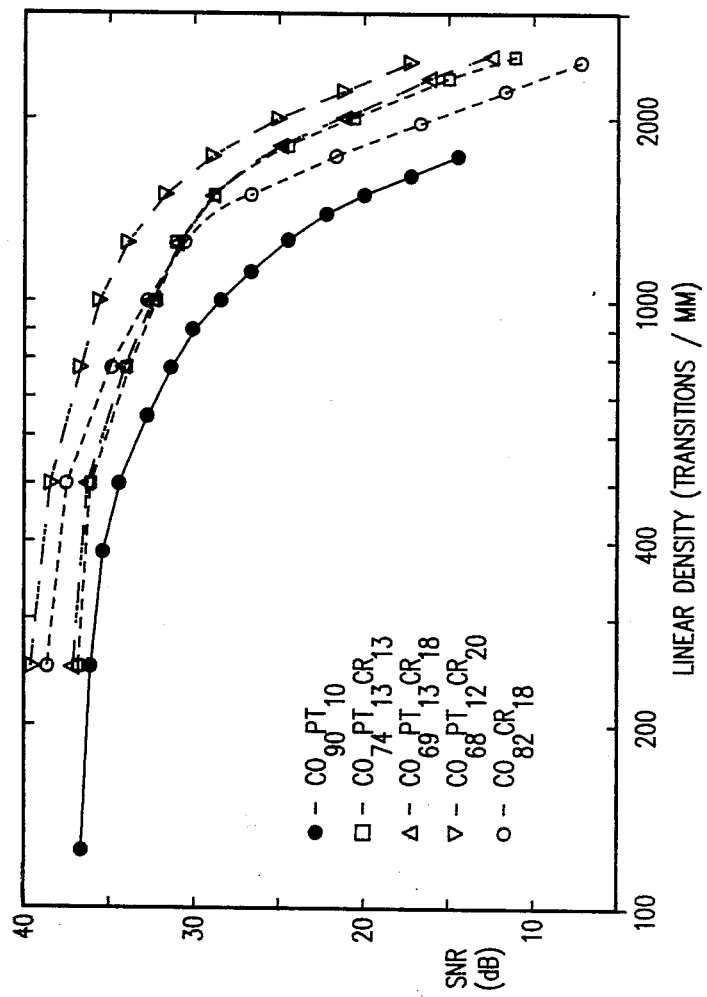
FIG. 1 is a plot of SNR as a function of linear recording density for disks with various magnetic layer compositions.

Referring now to FIG. 1, there is illustrated SNR data for various media as a function of linear recording density. The SNR measurements made in FIG. 1 are the ratio in dB of the readback signal voltage to the RMS disk noise voltage, at 30 MHz bandwidth, where both the signal and noise are measured at the same magnetic transition density. The data plotted in FIG. 1 illustrate the improved SNR with increasing chromium concentration in CoPtCr disks. At a recording density of approximately 1000 transitions per millimeter, for example, the CoPtCr disk with 20 at.% chromium shows approximately a 7 dB improvement over the $Co_{90}Pt_{10}$ disk and approximately a 3 dB improvement over the CoPtCr disk with 13 at.% chromium. The absolute value of improvement in SNR for CoPtCr disks with 18 and 20 at.% over the $Co_{90}Pt_{10}$ disk increases with increasing recording density. At approximately 1600 transitions per millimeter the SNR for the $Co_{68}Pt_{12}Cr_{20}$ disk is approximately 13 dB greater than the $Co_{90}Pt_{10}$ disk.

Figure 2:
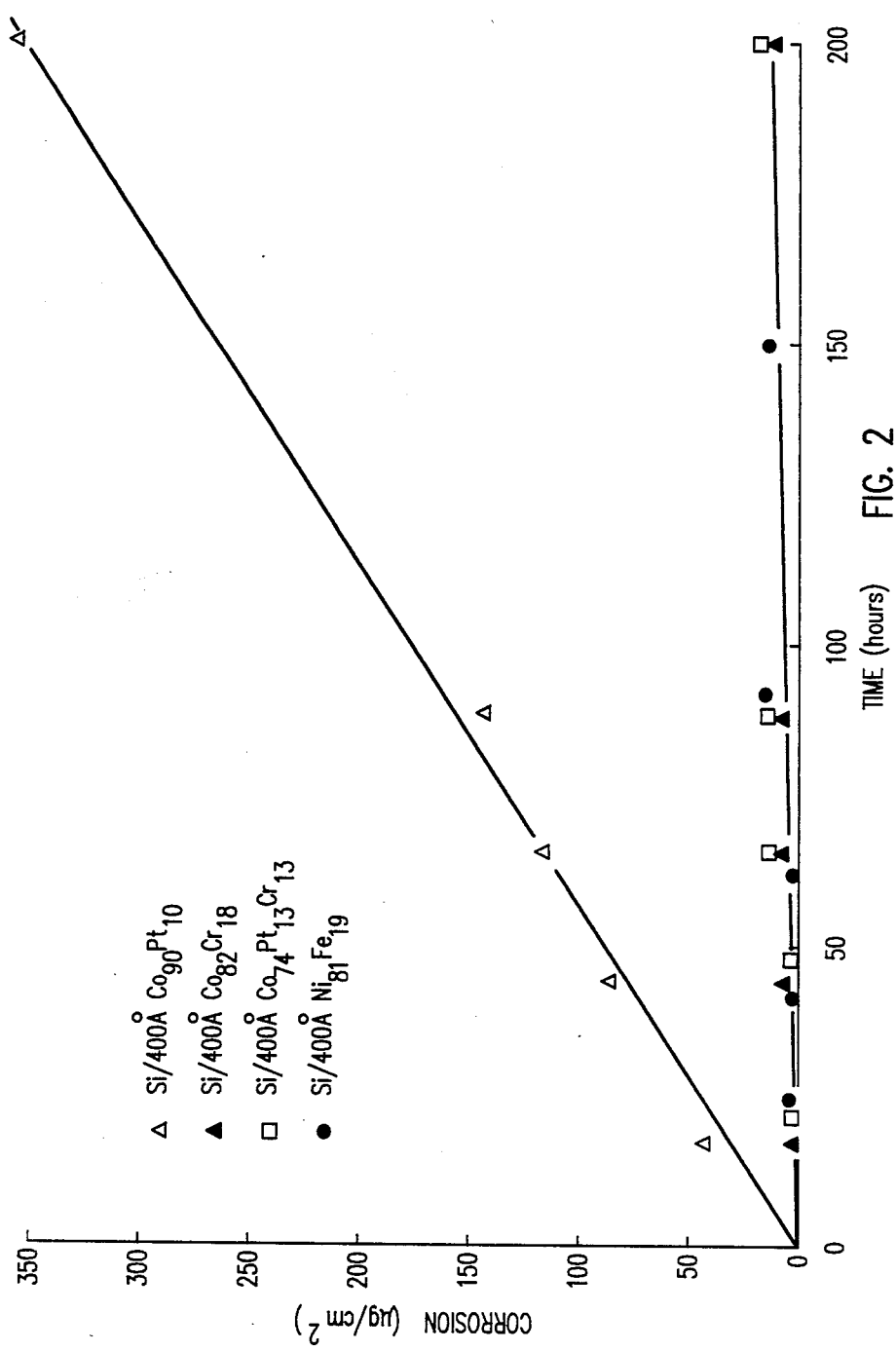
FIG. 2 is a plot of corrosion as a function of time for various magnetic layer compositions and for nickel-iron.

The previously cited Japanese reference (Kokai No. 59-88806) teaches that if a CoPtCr alloy is to be used as a magnetic layer, that the upper limit for the chromium concentration is 17 at.%. The obvious reason for this limit is that no substantial improvement in corrosion resistance is achieved by increasing chromium concentration above a specific value, i.e., approximately 13 at.%. This is apparent by reference to FIG. 2, which is a plot of corrosion in micrograms per square centimeter as a function of time for four different types of metal alloy layers of equal thickness sputter-deposited onto a silicon substrate. The samples of FIG. 2 were exposed to an atmosphere of $SO_2$, $NO_2$, $H_2S$ and HCl at 70% relative humidity and 25 degrees C. As shown in FIG. 2, the $Co_{90}Pt_{10}$ film has a substantially high and unacceptable corrosion rate, whereas the $Co_{74}Pt_{13}Cr_{13}$ film has a corrosion rate almost identical to that for cobalt-chromium ($Co_{82}Cr_{18}$) and nickel-iron ($Ni_{81}Fe_{19}$) films. Both $Co_{82}Cr_{18}$ and $Ni_{81}Fe_{19}$ films are known to have acceptable corrosion resistance.

An additional reason why it would not be apparent to use CoPtCr media with relatively high Cr concentration is that as the Cr concentration increases, there is a generally linear decrease in both coercivity (Hc) and squareness ($M_r/M_s$). That is shown by the data plotted in FIG. 3.

Figure 3:
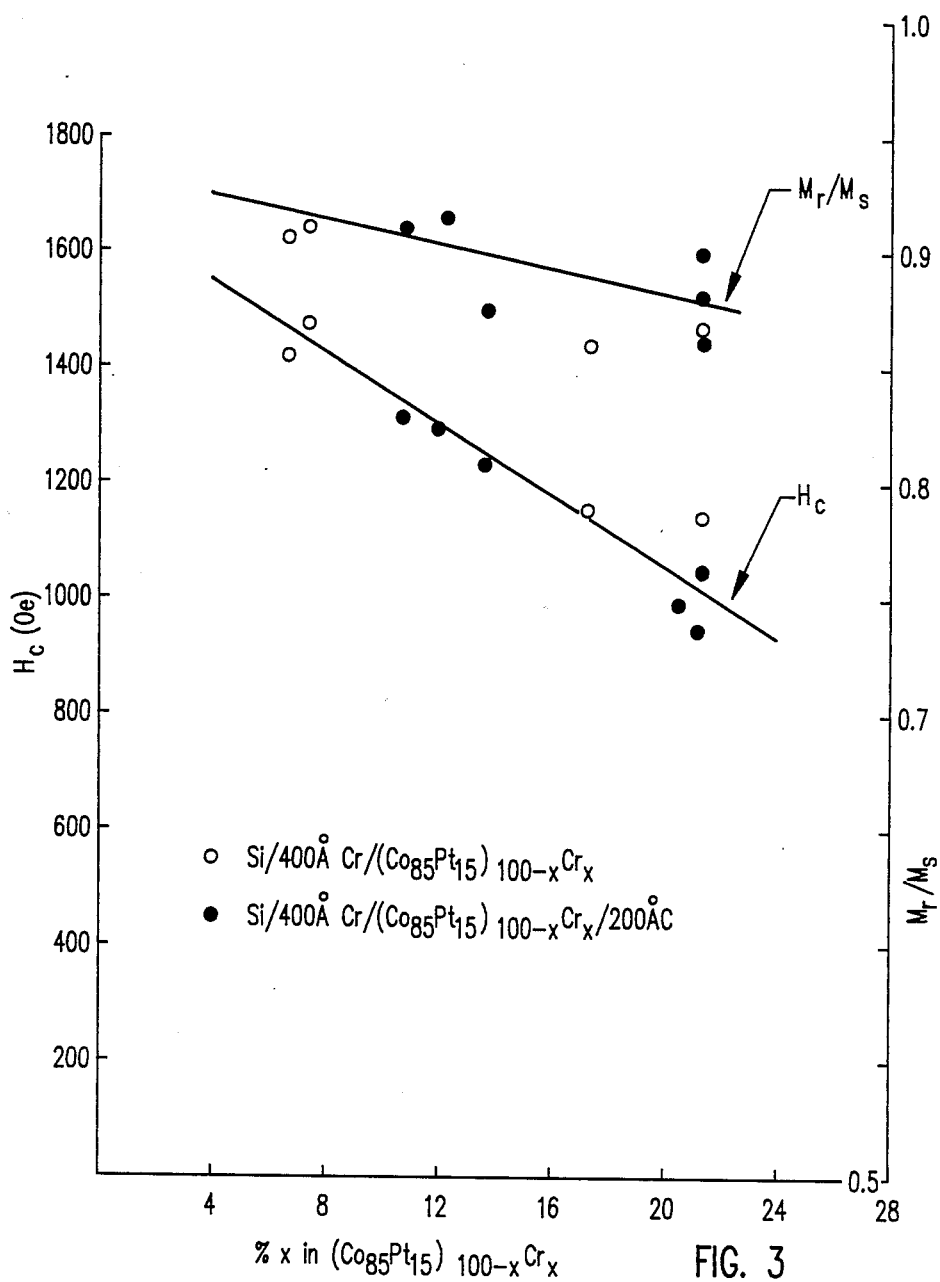
FIG. 3 is a plot of coercivity and squareness of CoPtCr disks as a function of Cr concentration.
Figure 4:
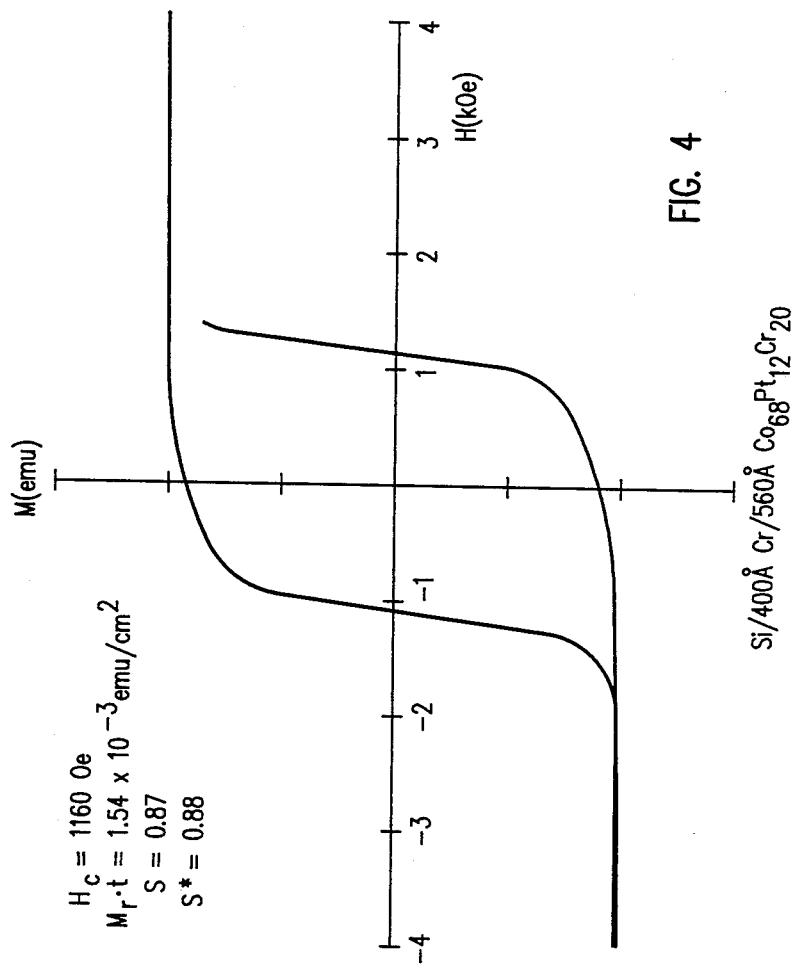
FIG. 4 is an M-H hysteresis loop for a $Co_{68}Pt_{12}Cr_{20}$ disk.

Certain magnetic properties of the CoPtCr (Cr>17 at.%) media are less desirable than CoPt media or CoPtCr (Cr<17 at.%) media, as is shown by FIG. 3. However, the reduction in Hc and $M_r/M_s$ with increasing Cr concentration is more than compensated by the improvement in SNR, which permits high-density recording not possible with CoPt media or CoPtCr (Cr<17 at.%). The CoPtCr (Cr>17 at.%) media exhibit clearly acceptable magnetic properties. For example, an M-H hysteresis loop for a thin film disk made according to the present invention, with chromium concentration of 20 at.%, is shown in FIG. 4, wherein the magnetic properties are listed. This disk was formed by sputter-depositing a 560 Å thick $Co_{68}Pt_{12}Cr_{20}$ film over a 400 Å thick Cr underlayer formed on a silicon substrate.

The thin film media according to the present invention also exhibit unexpectedly good values of measured time jitter, which confirms the high SNR values. The time jitter from the disks is measured by first writing a dibit pattern in tracks on the disks and then measuring the time intervals between successive peaks of the readback signal. A histogram is generated from these peak-to-peak time measurements, which results in a generally Gaussian distribution. A narrow value for this distribution, that is, a low 1-sigma value for this distribution, indicates consistent placement of the magnetic transitions on the media and little time jitter. The measured 1-sigma time jitter values are shown in Table 2 for a $Co_{90}Pt_{10}$ disk, gamma-$Fe_2O_3$ sputtered thin film and particulate disks, a $Co_{82}Cr_{18}$ disk, and CoPtCr disks with various amounts of Cr. As is apparent from Table 2, the 1-sigma time jitter for the $Co_{68}Pt_{12}Cr_{20}$ disk is 2–3 times better than for the $Co_{90}Pt_{10}$ disk or gamma-$Fe_2O_3$ particulate disk and extremely close to that of the gamma-$Fe_2O_3$ sputtered disk.

TABLE 2

| Disk | Time Jitter 1-sigma (nsec.) |
|---|---|
| $Co_{90}Pt_{10}$ | 0.90 |
| $\gamma$-$Fe_2O_3$ (particulate) | 0.71 |
| $Co_{74}Pt_{13}Cr_{13}$ | 0.54 |
| $Co_{69}Pt_{13}Cr_{18}$ | 0.52 |

TABLE 2-continued

| Disk | Time Jitter 1-sigma (nsec.) |
| --- | --- |
| $Co_{82}Cr_{18}$ | 0.51 |
| $Co_{68}Pt_{12}Cr_{20}$ | 0.35 |
| $\gamma\text{-}Fe_2O_3$ (sputtered) | 0.31 |

MEASURED TIME JITTER (@1500 transitions/mm)

The platinum in the CoPtCr magnetic layer improves the coercivity of the media. However, both Pt and Cr decrease the magnetic moment of the CoPtCr magnetic layer. While the Cr concentration must be greater than 17 at.% to produce the improved SNR and time jitter performance, the concentration of Pt may cover a relatively wide range provided the combined Cr and Pt do not render the CoPtCr layer nonmagnetic. For example, while the media listed in Table 1 experienced excellent magnetic recording properties when Cr was between 18–21 at.% and Pt between 12–13 at.%, if the Cr concentration were to be substantially increased the Pt concentration would likely have to be reduced.

A nucleating layer or underlayer, such as the chromium or chromium-vanadium ($Cr_{80}V_{20}$) underlayer used in the fabrication of the disks described herein, improves the in-plane C-axis orientation of the CoPtCr (Cr>17 at.%) magnetic layer, especially when the substrate is single-crystal semiconductor grade silicon. However, it has been found that a Cr or CrV underlayer is not absolutely necessary, especially if the substrate is AlMg/NiP. CoPtCr (Cr>17 at.%) magnetic layers have been successfully sputter-deposited directly onto AlMg/NiP substrates.

Thin film metal alloy disks also typically include a protective overcoat, such as a sputter-deposited essentially amorphous carbon film, formed over the magnetic layer, and an adhesion or barrier layer between the protective overcoat and the magnetic layer. However, because the CoPtCr (Cr>17 at.%) magnetic layer provides excellent corrosion resistance, it is not necessary to utilize a barrier layer between the magnetic layer and the protective carbon overcoat, as is required with CoPt disks.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A magnetic recording disk for horizontal recording comprising:
   a substrate of an aluminum alloy having a nickel-phosphorous (NiP) surface film formed thereon;
   a magnetic layer formed directly on and adhered directly to the NiP film of the substrate and comprising an alloy of cobalt, platinum and chromium with chromium present in the alloy in an amount greater than 17 atomic percent, the magnetic layer having horizontal magnetic anisotropy; and
   a protective overcoat formed over the magnetic layer.

2. The magnetic recording disk according to claim 1 wherein the protective overcoat is a sputter-deposited essentially amorphous carbon film.

3. A magnetic recording disk for horizontal recording comprising:
   a substrate of either silicon or an aluminum alloy with a nickel-phosphorous surface film;
   an underlayer consisting of chromium, the underlayer being formed on and adhered to the substrate;
   a magnetic layer of cobalt-platinum-chromium alloy, with chromium present in the magnetic layer alloy in an amount greater than 17 atomic percent, formed on and adhered to the underlayer, the magnetic layer having horizontal magnetic anisotropy; and
   a protective overcoat formed over the magnetic layer.

* * * * *